United States Patent
van de Burgt et al.

(10) Patent No.: US 10,567,192 B2
(45) Date of Patent: Feb. 18, 2020

(54) CONTROLLER AREA NETWORK (CAN) DEVICE AND METHOD FOR OPERATING A CAN DEVICE

(71) Applicant: NXP B.V., Eindhoven (NL)

(72) Inventors: Rolf van de Burgt, Oosterbeek (NL); Clemens Gerhardus Johannes de Haas, Ewijk (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/927,936

(22) Filed: Mar. 21, 2018

(65) Prior Publication Data

US 2019/0296938 A1    Sep. 26, 2019

(51) Int. Cl.
*H04L 12/40*    (2006.01)

(52) U.S. Cl.
CPC  *H04L 12/4013* (2013.01); *H04L 2012/40215* (2013.01)

(58) Field of Classification Search
CPC ............. H04L 12/4013; H04L 2012/40215
See application file for complete search history.

(56) References Cited

U.S. PATENT DOCUMENTS

| 7,594,226 | B2 * | 9/2009 | Stelzer ............... G06F 17/5054 717/105 |
| 8,566,632 | B2 | 10/2013 | van de Burgt et al. |
| 9,330,045 | B2 | 5/2016 | Muth et al. |
| 9,471,528 | B2 | 10/2016 | Muth |
| 9,825,918 | B2 | 11/2017 | Sharma et al. |
| 2013/0290580 | A1 | 10/2013 | Hartwich et al. |
| 2013/0294540 | A1* | 11/2013 | Hell ............... H04L 25/0272 375/295 |
| 2013/0322463 | A1 | 12/2013 | Hartwich et al. |
| 2015/0095711 | A1 | 4/2015 | Elend |
| 2016/0080168 | A1* | 3/2016 | Lieder ............... H04L 12/40032 370/468 |
| 2016/0254926 | A1 | 9/2016 | Walker et al. |
| 2016/0342531 | A1 | 11/2016 | Sharma |
| 2017/0063571 | A1 | 3/2017 | Hehemann et al. |
| 2017/0070366 | A1* | 3/2017 | Hehemann ........ H04L 12/4013 |
| 2017/0109309 | A1 | 4/2017 | van de Burgt et al. |
| 2017/0192920 | A1* | 7/2017 | Thiele ............... H04L 12/40084 |
| 2018/0199349 | A1* | 7/2018 | Hehn ............... H04B 7/0617 |

FOREIGN PATENT DOCUMENTS

EP    2 660 974 A2    11/2013

OTHER PUBLICATIONS

"Understanding Microchip's CAN Module Bit Timing—AN754", Microchip Technology Inc., 13 pgs. retrieved from the internet at: http://ww1.microchip.com/downloads/en/appnotes/00754.pdf (2001).

* cited by examiner

*Primary Examiner* — Brian D Nguyen
(74) *Attorney, Agent, or Firm* — Rajeev Madnawat (57) ABSTRACT

Embodiments of a method and a device are disclosed. In an embodiment, a method for operating a Controller Area Network (CAN) transceiver involves detecting phase information related to a CAN data frame that is transmitted by the CAN transceiver and in response to the phase information, switching between different transmitter configurations of the CAN transceiver within a bit interval for use in transmitting subsequent bits of the CAN data frame.

8 Claims, 7 Drawing Sheets

CONTROLLER AREA NETWORK (CAN) DEVICE AND METHOD FOR OPERATING A CAN DEVICE

BACKGROUND

In-vehicle networks (IVNs) can be used for communications within vehicles. For example, controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. However, the number of pins in a microcontroller, especially an automotive microcontroller, is limited. In some instances, it can be expensive or even impossible to add a new pin to an existing microcontroller.

SUMMARY

Embodiments of a method and a device are disclosed. In an embodiment, a method for operating a CAN transceiver involves detecting phase information related to a CAN data frame that is transmitted by the CAN transceiver and in response to the phase information, switching between different transmitter configurations of the CAN transceiver within a bit interval for use in transmitting subsequent bits of the CAN data frame. Other embodiments are also described.

In an embodiment, the different transmitter configurations comprise different transmission data rates.

In an embodiment, switching between the different transmission data rates comprises in response to the phase information, switching from a first transmitter configuration with a lower transmission data rate to a second transmitter configuration with a higher transmission data rate within the bit interval for use in transmitting the subsequent bits of the CAN data frame.

In an embodiment, different transmitter configurations comprise different transmission impedance configurations, different transmission voltage configurations, different transmission current configurations, or different emission configurations.

In an embodiment, the phase information indicates a data phase that follows an arbitration phase.

In an embodiment, the CAN transceiver has exclusive access to a CAN bus during the data phase.

In an embodiment, switching between the different transmitter configurations of the CAN transceiver comprises in response to the phase information, switching from a first transmitter of the CAN transceiver to a second transmitter of the CAN transceiver within the bit interval for use in transmitting the subsequent bits of the CAN data frame.

In an embodiment, the first and second transmitters have different transmission impedance configurations, different transmission voltage configurations, different transmission current configurations, or different emission configurations.

In an embodiment, the second transmitter has a higher transmission data rate than the first transmitter.

In an embodiment, the phase information indicates a data phase that follows an arbitration phase.

In an embodiment, the CAN transceiver has exclusive access to a CAN bus during the data phase.

In an embodiment, a CAN transceiver includes a transmitter unit configured to transmit a CAN data frame and a protocol sampler connected to the transmitter unit and configured to detect phase information related to the CAN data frame and in response to the phase information, switch between different transmitter configurations of the transmitter unit within a bit interval for use in transmitting subsequent bits of the CAN data frame.

In an embodiment, the different transmitter configurations comprise different transmission data rates.

In an embodiment, the protocol sampler is further configured to, in response to the phase information, switch from a first transmitter configuration with a lower transmission data rate to a second transmitter configuration with a higher transmission data rate within the bit interval for use in transmitting the subsequent bits of the CAN data frame.

In an embodiment, the different transmitter configurations comprise different transmission impedance configurations, different transmission voltage configurations, different transmission current configurations, or different emission configurations.

In an embodiment, the phase information indicates a data phase that follows an arbitration phase.

In an embodiment, the CAN transceiver has exclusive access to a CAN bus during the data phase.

In an embodiment, the transmitter unit comprises a first transmitter and a second transmitter, and the protocol sampler is further configured to, in response to the phase information, switch from the first transmitter to the second transmitter within the bit interval for use in transmitting a first section of a particular bit of the CAN data frame and switch from the second transmitter to the first transmitter within the bit interval for use in transmitting a second section of the particular bit of the CAN data frame.

In an embodiment, the second transmitter has a higher transmission data rate than the first transmitter.

In an embodiment, a method for operating a CAN transceiver involves detecting phase information related to a CAN data frame that is transmitted by the CAN transceiver and in response to the phase information, switching from a first transmitter of the CAN transceiver to a second transmitter of the CAN transceiver within a bit interval for use in transmitting subsequent bits of the CAN data frame. The phase information indicates a data phase that follows an arbitration phase, the CAN transceiver has exclusive access to a CAN bus during the data phase, and the second transmitter has a higher transmission data rate than the first transmitter.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Techniques described herein can be applied to any type of in-vehicle networks (IVNs), including a Controller Area Network (CAN), a Local Interconnect Network (LIN), a Media Oriented Systems Transport (MOST) network, a FlexRay® compatible network, and other types of IVNs. Although in some embodiments a specific type of IVN is described, it should be noted that the invention is not restricted to a specific type of IVN.

Figure 1:
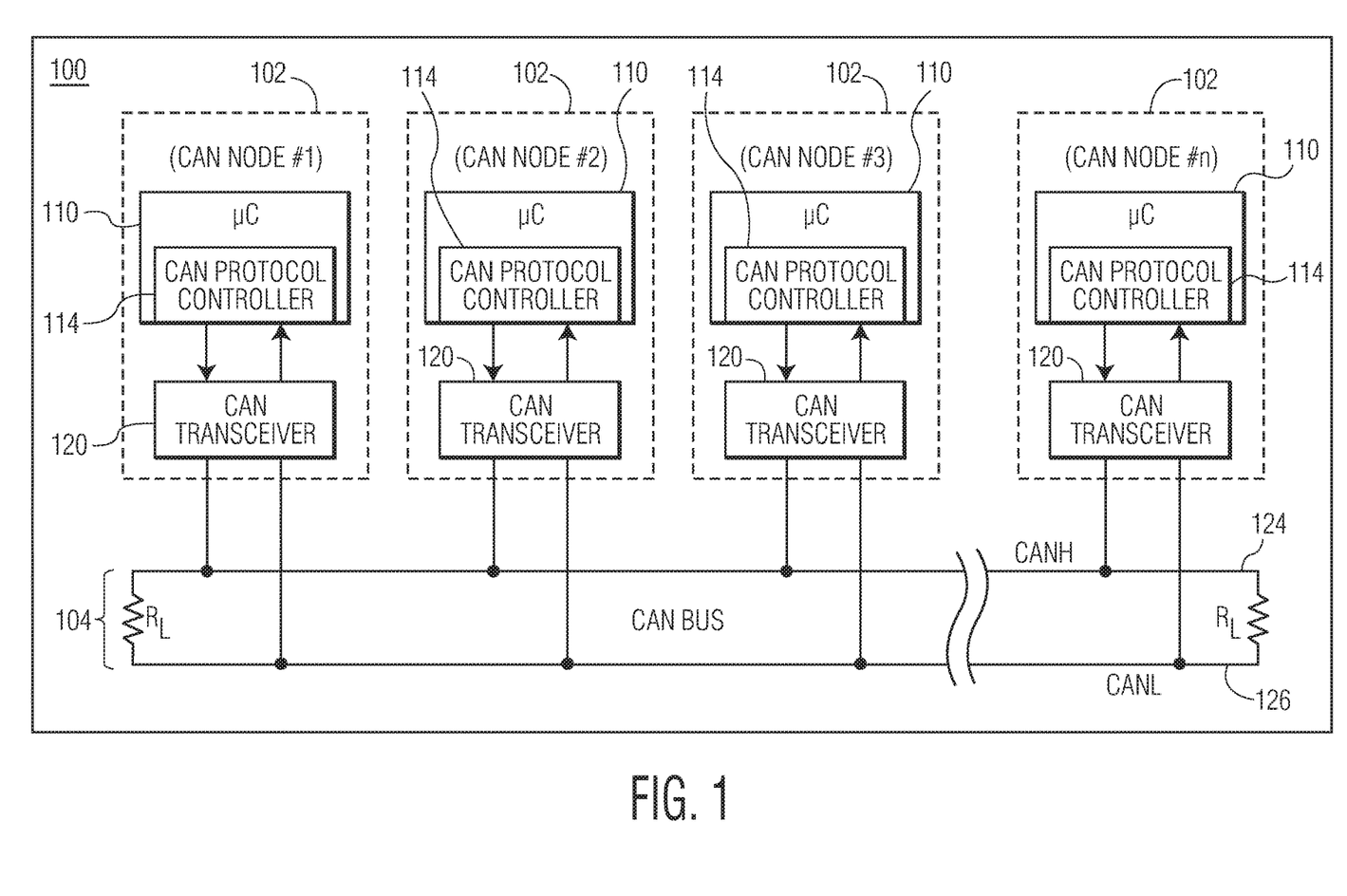
FIG. 1 depicts a CAN network that includes multiple CAN nodes connected to a CAN bus.

FIG. 1 depicts a CAN network 100 that includes multiple CAN nodes 102, also referred to as "ECUs," each connected to a CAN bus 104. In the embodiment of FIG. 1, each CAN node includes a microcontroller 110 having an embedded CAN protocol controller 114 and a CAN transceiver 120. The microcontrollers are typically connected to at least one device (not shown) such as a sensor, an actuator, or some other control device and are programmed to determine the meaning of received messages and to generate appropriate outgoing messages. The microcontrollers, also referred to as host processors, hosts, or digital signal processors (DSPs), are known in the field. In an embodiment, the host supports application software that interacts with the CAN protocol controller.

The CAN protocol controllers 114, which can be embedded within the microcontrollers 110 or external to the microcontrollers (e.g., a separate IC device), implement data link layer operations as is known in the field. For example, in receive operations, a CAN protocol controller stores received serial bits from the transceiver until an entire message is available for fetching by the microcontroller. The CAN protocol controller can also decode the CAN messages according to the standardized frame format of the CAN protocol. In transmit operations, the CAN protocol controller receives messages from the microcontroller and transmits the messages as serial bits in the CAN data frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller 114 can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. The CAN bus is known in the field.

Figure 2:
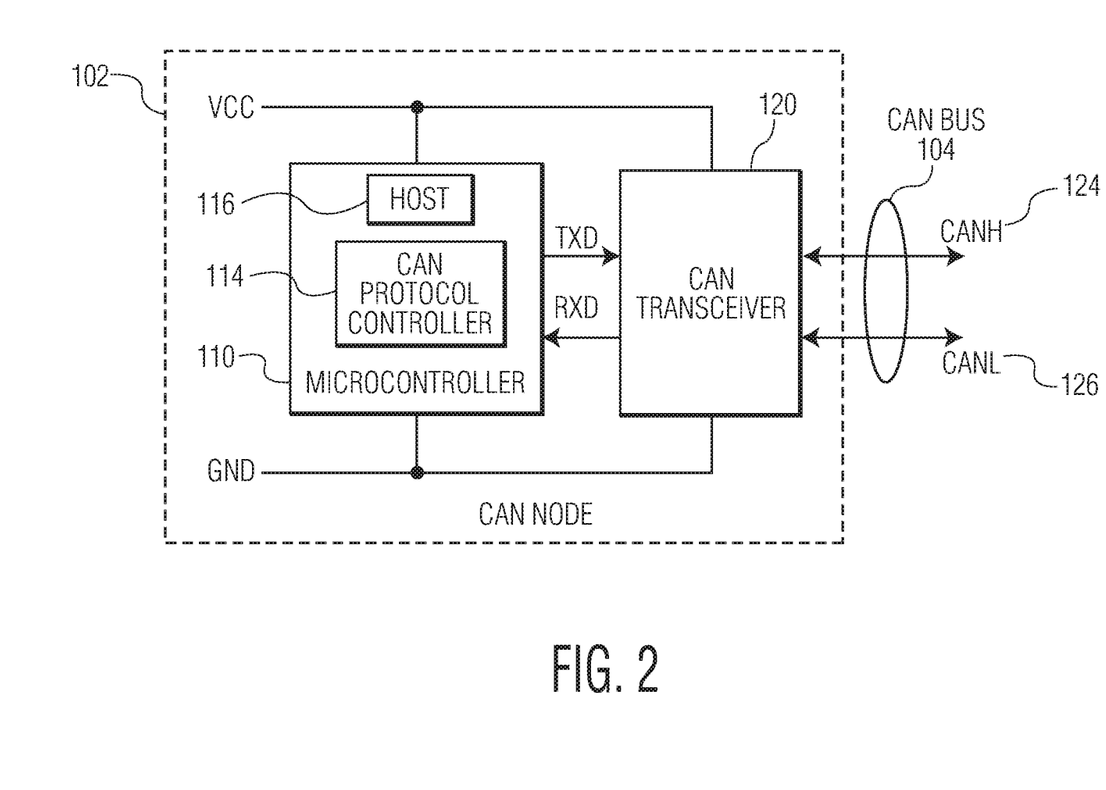
FIG. 2 depicts an expanded view of one CAN node from FIG. 1.

FIG. 2 depicts an expanded view of one CAN node 102 from FIG. 1. In the expanded view of FIG. 2, the microcontroller includes a host 116, which may be, for example, a software application that is stored in memory of the microcontroller and executed by processing circuits of the microcontroller. The microcontroller 110 and the CAN transceiver 120 of the CAN node are connected between a supply voltage, $V_{CC}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Throughout the description, TXD is carried on a TXD path and RXD is carried on an RXD path. Data is communicated to and from the CAN bus via the CANH and CANL bus lines 124 and 126, respectively.

As noted above, the CAN protocol controller 114 can be configured to support the normal mode or the flexible data rate mode. As used herein, "CAN normal mode" (also referred to as "Classical CAN mode") refers to frames that are formatted according to the ISO 11898-1 standard and "CAN FD mode" refers to frames that are formatted according to the emerging ISO/Draft International Standard (DIS) 11898-1 standard, or an equivalent thereof.

Figure 3:
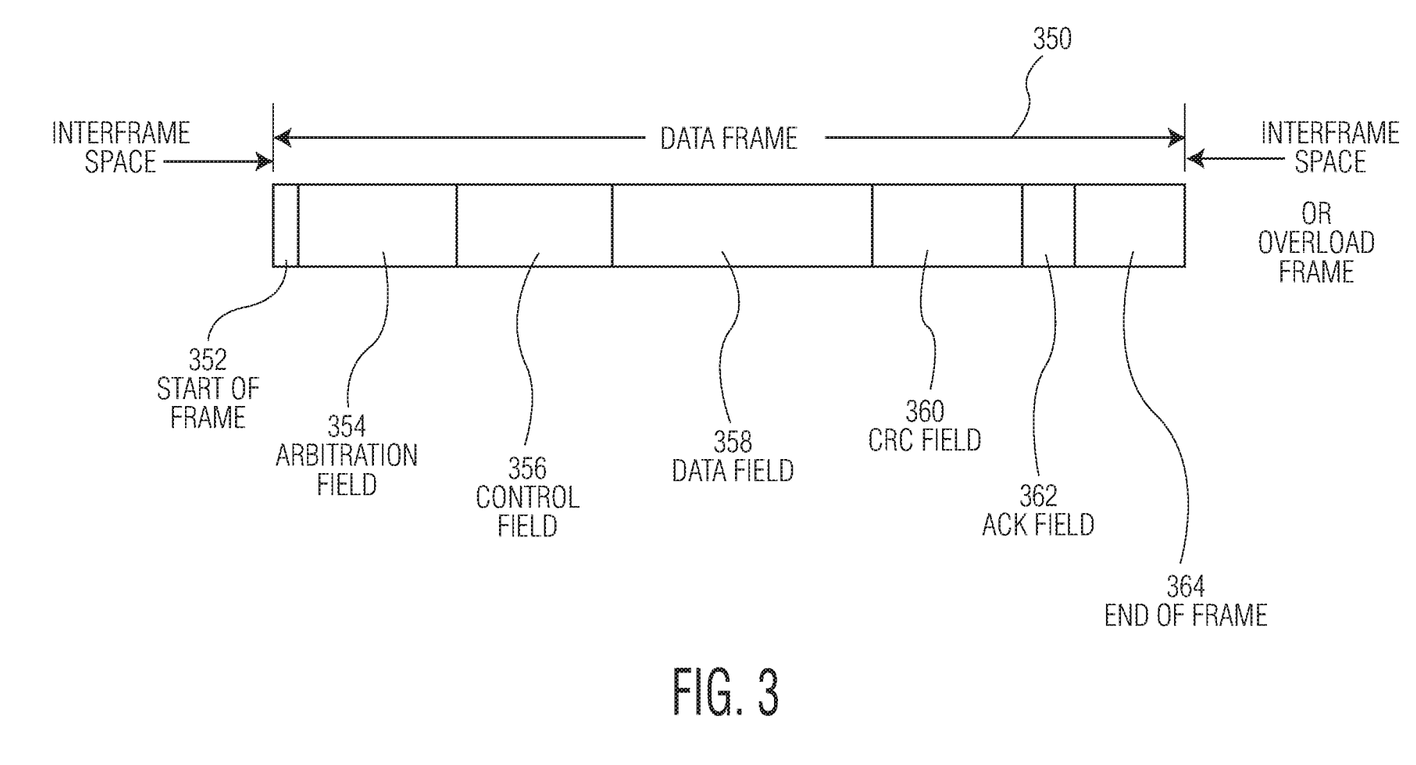
FIG. 3 depicts the format of a CAN data frame that is transmitted by a CAN transceiver of the CAN node depicted in FIG. 2.

FIG. 3 depicts the format of a CAN data frame 350 that is transmitted by the CAN transceiver 120 depicted in FIG. 2. The CAN data frame depicted in FIG. 3 may be an ISO 11898-1 compatible frame (in the classical base frame format (CBFF) or standard format) that is used in CAN normal mode or an ISO/DIS 11898-1 compatible frame (in the FD base frame format or FBFF) that is used in CAN FD mode. As depicted in FIG. 3, the CAN data frame includes a Start of Frame (SOF) field 352, an arbitration field 354, a control field 356, a data field 358, a Cyclic Redundancy Check (CRC) field 360, an Acknowledgement (ACK) field 362, and an End Of Frame (EOF) field 364. In an SOF phase, the SOF field of the CAN data frame is transmitted by the CAN transceiver. In an arbitration phase that follows the SOF phase, the arbitration field of the CAN data frame is transmitted by the CAN transceiver. In some embodiments, the arbitration field includes identifier bits, remote transmission request, and ID Extension. The control field may include a Reserved Bit and a Data Length Code. In some other embodiments, the arbitration field includes identifier bits, remote transmission request and ID Extension, while the control field includes a FD Format, Baud Rate Switch, Error State Indicator and a Data Length Code. In a control phase that follows the arbitration phase, the control field of the CAN data frame is transmitted by the CAN transceiver. In a data phase that follows the arbitration phase, the data field of the CAN data frame is transmitted by the CAN transceiver. In a CRC phase that follows the data phase, the CRC field of the CAN data frame is transmitted by the CAN transceiver. In an ACK phase that follows the CRC phase, the ACK field of the CAN data frame is transmitted by the CAN transceiver. In an EOF phase that follows the ACK phase, the EOF field of the CAN data frame is transmitted by the CAN transceiver.

During the reception of the arbitration field 354 of the CAN data frame 350, there can be multiple CAN nodes in the CAN network 100 that are transmitting their identifier (ID) on the CAN bus 104. After the arbitration field is transmitted by the CAN transceiver 120 in the arbitration phase, the control, data, CRC, and ACK fields 356, 358, 360, 362 are transmitted by the CAN transceiver, respectively. After the arbitration phase, only the CAN node 102 that has won the arbitration, is allowed to transmit on the CAN bus. Consequently, during the transmission of the control field 356, the data field 358, the CRC field 360, and the ACK field 362, no disturbance on the bit timing due to multiple senders is expected.

In accordance with an embodiment of the invention, a CAN transceiver includes a transmitter unit configured to transmit a CAN data frame and a protocol sampler connected to the transmitter unit and configured to detect phase information related to the CAN data frame and to, in response to the phase information, switch between different transmitter configurations of the transmitter unit within a bit interval for use in transmitting subsequent bits of the CAN data frame. In some embodiments, a bit interval is the time duration in which a CAN bit is transmitted by the CAN transceiver. By detecting phase information related to a CAN data frame and switching between different transmitter configurations within a bit interval for use in transmitting subsequent bits of the CAN data frame, the transmitter configuration of the CAN transceiver can be adjusted to accommodate different phases in the transmission of the CAN data frame. For example, the CAN transceiver can use a transmitter configuration with a lower transmission data rate during an arbitration phase when the CAN transceiver competes with other CAN nodes for accessing a CAN bus and can use a transmitter configuration with a higher transmission data rate during a data phase when the CAN transceiver has exclusive access to the CAN bus. Consequently, the transmission characteristics (e.g., the transmission throughput) of the CAN transceiver can be improved. For example, the transmission throughput of the CAN transceiver can be improved because of the higher transmission data rate used during a data phase when the CAN transceiver has exclusive access to the CAN bus.

Figure 4:
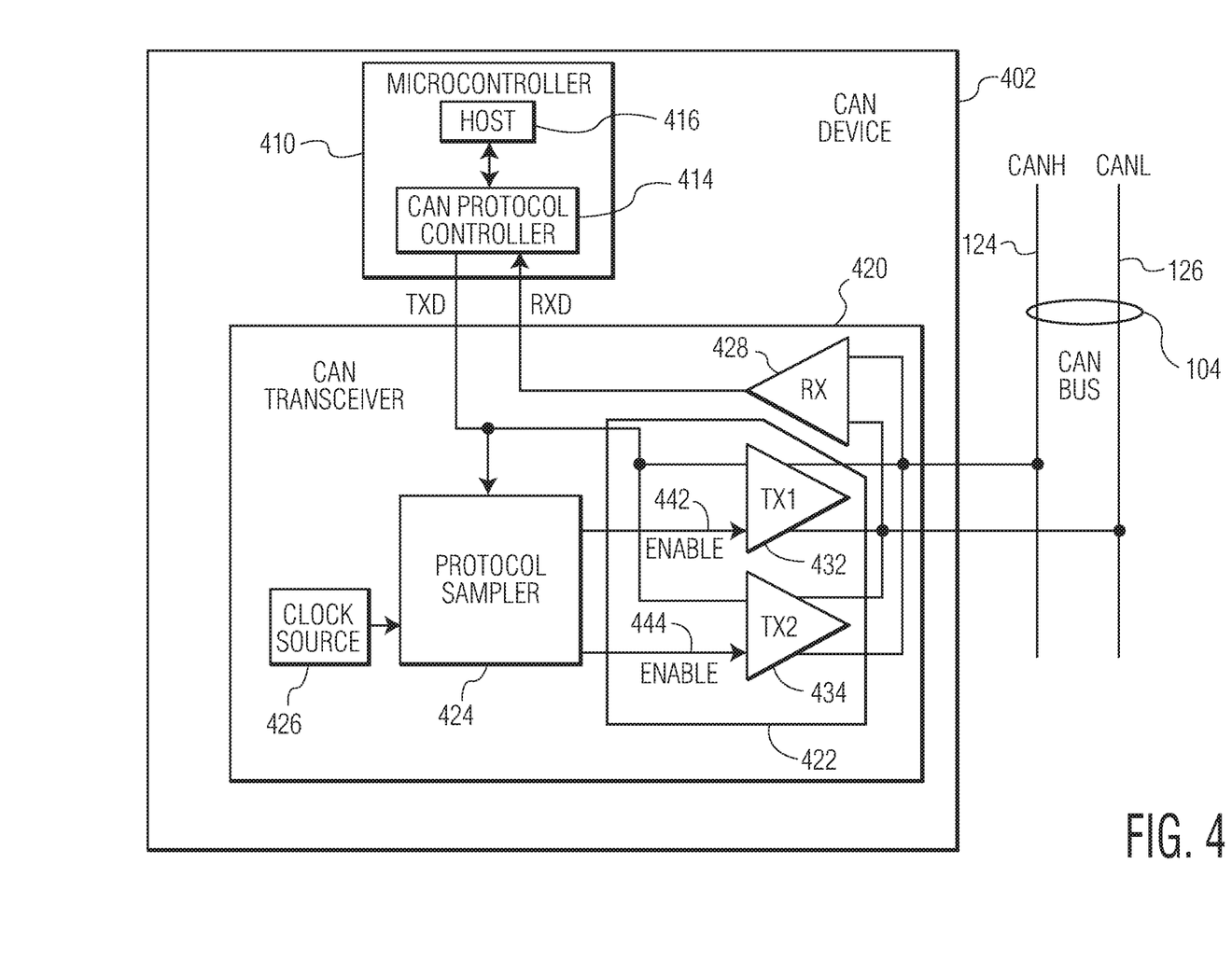
FIG. 4 depicts a CAN device that includes a CAN transceiver that can switch between different transmitter configurations.

FIG. 4 depicts a CAN device 402 that includes a CAN transceiver 420 that can switch between different transmitter configurations. The CAN device depicted in FIG. 4 may be an embodiment of the CAN node 102 depicted in FIGS. 1 and 2. However, the CAN node 102 depicted in FIG. 1 is not limited to the embodiment shown in FIG. 4. In the embodiment depicted in FIG. 4, the CAN device includes a microcontroller 410 having an embedded CAN protocol controller 414 and the CAN transceiver 420, which includes a transmitter unit 422, a protocol sampler 424, a clock source 426, and a receiver unit 428. In some embodiments, the microcontroller includes a host 416, which may be, for example, a software application that is stored in memory of the microcontroller and executed by processing circuits of the microcontroller. The CAN device is be connected to the CAN bus 104 and may receive data from other devices from the CAN bus. In an embodiment, the transmitter unit, the protocol sampler, the clock source, and the receiver unit are included in the same IC package. Although the illustrated CAN device is shown with certain components and described with certain functionality herein, other embodiments of the CAN device may include fewer or more components to implement the same, less, or more functionality.

In a CAN node that uses a microcontroller to control its CAN transceiver in response to CAN frame phase information, a connection between the microcontroller and the CAN transceiver is required for the transmission of a control signal from the microcontroller to the CAN transceiver. Consequently, an additional pin or electrical terminal is required in the microcontroller (e.g., a microcontroller Integrated Circuit (IC)) of the CAN node for the control signal connection between the microcontroller and the CAN transceiver (e.g., a CAN transceiver IC). However, the number of pins in a microcontroller IC, especially an automotive microcontroller IC, is limited. In some instances, it can be expensive or even impossible to add a new pin to an existing microcontroller IC. Compared to a CAN node that uses the microcontroller to control the CAN transceiver in response to CAN frame phase information, the CAN device 402 depicted in FIG. 4 utilizes the CAN transceiver 420 to detect CAN frame phase information and switch between different transmitter configurations in response to the CAN frame phase information. For example, the CAN transceiver 420 can detect phase information related to a CAN data frame and in response to the phase information, switch between different transmitter configurations of the transmitter unit for use in transmitting subsequent bits of the CAN data frame. In some embodiments, the microcontroller 410 is implemented as an IC (e.g., an IC chip) and the CAN transceiver 420 is implemented as another IC (e.g., an IC chip) that is separate from the IC in which the microcontroller is implemented. Consequently, the CAN device 402 depicted in FIG. 4 does not require an extra pin at the microcontroller 410 for a transmission configuration control signal from the microcontroller to the CAN transceiver. Therefore, the CAN transceiver 420 can be used with (i.e., backward compatible) with existing microcontroller ICs that have predetermined number of pins.

The transmitter unit 422 is configured to transmit one or more CAN data frames. The transmitter unit may be implemented in suitable logical circuits and/or analog circuits. In the embodiment depicted in FIG. 4, the transmitter unit includes a first transmitter 432 (TX1) and a second transmitter 434 (TX2). The first transmitter is connected to the microcontroller 410 to receive transmit data from the microcontroller 410 on the TXD path, connected to the CANH bus line 124 and the CANL bus line 126 of the CAN bus 104 to transmit CAN data to the CAN bus, and connected to the protocol sampler 424 to receive a control signal for switching transmitter configurations (e.g., an enable signal or a disable signal). The second transmitter 434 is connected to the microcontroller to receive transmit data (TXD) from the microcontroller on the TXD path, connected to the CANH bus line 124 and the CANL bus line 126 of the CAN bus 104 to transmit CAN data to the CAN bus, and connected to the protocol sampler to receive control signal for switching transmitter configurations (e.g., an enable signal or a disable signal). Each transmitter may have a unique transmitter configuration. Although the illustrated transmitter unit is shown with certain components and described with certain functionality herein, other embodiments of the transmitter unit may include fewer or more components to implement the same, less, or more functionality. For example, in some embodiments, the transmitter unit includes only one transmitter that can be configured with different transmission configurations, including different transmission data rates, different transmission impedance configurations, different transmission voltage configurations, different transmission current configurations, and/or different emission configurations. In some other embodiments, the transmitter unit includes more than two transmitters having different transmission configurations.

The receiver unit (RX) 428 is configured to receive CAN data from the CAN bus 104. In the embodiment depicted in FIG. 4, the receiver unit is connected to the CANH bus line 124 and the CANL bus line 126 of the CAN bus 104 to receive CAN data from the CAN bus and to transmit received data to the microcontroller 410 on the RXD path. The receiver unit may be implemented in suitable logical circuits and/or analog circuits. Although in the embodiment depicted in FIG. 4, the CAN transceiver includes one receiver unit, in other embodiments, the CAN transceiver may include multiple receiver units configured to receive CAN data frames from the CAN bus.

The protocol sampler 424 is operably connected to the transmitter unit 422 and is configured to perform one or more control functions. The protocol sampler may be implemented in suitable logical circuits and/or analog circuits. In some embodiments, the protocol sampler is implemented using a processor such as a microcontroller or a central processing unit (CPU), which can generate control signals for at least one of the first and second transmitters 432 and 434. In an embodiment, the protocol sampler can generate enable and/or disable signals for at least one of the first and second transmitters. For example, the protocol sampler can generate an enable signal 442 for the first transmitter 432 and an enable signal 444 for the second transmitter 434. In some embodiments, the protocol sampler includes at least one switch that can be used to switch on or off at least one of the first and second transmitters.

In the embodiment depicted in FIG. 4, the protocol sampler is configured to detect phase information related to a CAN data frame and to, in response to the phase information, switch between different transmitter configurations of the transmitter unit within a bit interval for use in transmitting subsequent bits of the CAN data frame. Examples of different transmission configurations includes, without being limited to, different transmission data rates, different transmission impedance configurations, different transmission voltage configurations, different transmission current configurations, and different emission configurations. In some embodiments, a bit interval is the time duration in which a CAN bit is transmitted by the transmitter unit 422. In some embodiments, the protocol sampler switches from one of the first and second transmitters to another one of the first and second transmitters for use in transmitting subsequent bits or a subsequent section of a bit of a CAN data frame. In an embodiment, the protocol sampler is configured to, in response to detected phase information, switch from the first transmitter 432 to the second transmitter 434 within a bit interval for use in transmitting a first section of a particular bit of a CAN data frame and switch from the second transmitter to the first transmitter of the CAN transceiver within the bit interval for use in transmitting a second section of the particular bit of the CAN data frame. For example, a bit is transmitted by the first transmitter 432 initially, subsequently a middle section of the bit is transmitted by the second transmitter 434, and the end of the bit is transmitted by the first transmitter. In some embodiments, the protocol sampler switches from one of the first and second transmitters to both the first and second transmitters for use in transmitting subsequent bits of a CAN data frame.

In some embodiments, the detected phase information indicates a data phase that follows an arbitration phase. In an embodiment, in the data phase, a data field of a CAN data frame (e.g., the data field 358 of the CAN data frame 350 depicted in FIG. 3) is transmitted by the transmitter unit 422. In the arbitration phase, an arbitration field of a CAN data frame (e.g., the arbitration field 354 of the CAN data frame depicted in FIG. 3) is transmitted by the transmitter unit. For example, the detected phase information indicates that an arbitration field of a CAN data frame has been transmitted by the transmitter unit and that a data field of the CAN data frame is currently being transmitted by the transmitter unit. During the arbitration phase, the CAN transceiver competes with other CAN nodes to access the CAN bus 104 and does not have exclusive access to the CAN bus while during the data phase, the CAN transceiver has exclusive access to the CAN bus. Because of the length of the CAN bus 104, dominant bits transmitted by another CAN device at the other end of the CAN bus will be received with a delay, which needs to be considered during the arbitration phase. Consequently, the data rate during the arbitration phase is limited by the delay in dominant bits. During the data phase, the protocol sampler 424 can increase the transmission data rate by switching between different transmitter configurations of the transmitter unit, even given the ringing and reflections that may exist, which can cause inter symbol interference. At the end of a CAN data frame, the protocol sampler 424 can reduce the transmission data rate by switching between different transmitter data rates of the transmitter unit, e.g., to the same transmission data rate as the arbitration phase, to allow a proper sampling of the acknowledgement messages of other devices.

In some embodiments, the protocol sampler 424 decodes a CAN data frame with a clock signal from the clock source 426 to detect phase information related to the CAN data frame. The clock source does not need to have a perfect accuracy. For example, the clock source may have an accuracy that is greater than 99.6% or 99.5%. Compared to a CAN node that utilizes a clock source that is external to a CAN transceiver of the CAN node, the CAN transceiver 420 of the CAN device 402 depicted in FIG. 4 utilizes the clock source 426 that is included within the CAN transceiver 420. Consequently, compared to a CAN node that utilizes a clock source that is external to a CAN transceiver of the CAN node, the CAN transceiver 420 does not need an additional expensive external component such as crystals.

In some embodiments, the protocol sampler 424 is configured to, in response to the detected phase information, switch from the first transmitter 432 to the second transmitter 434 of the CAN transceiver within a bit interval for use in transmitting subsequent bits of a CAN data frame. In some embodiments, a bit interval is the time duration in which a CAN bit is transmitted by the transmitter unit 422. The first and second transmitters have different transmission configurations. For example, the first transmitter 432 has a lower transmission data rate and the second transmitter 434 has a higher transmission data rate or vice versa. The first transmitter may be different from the second transmission in hardware components, software settings, and/or firmware settings. In an embodiment, the first transmitter 432 includes an output stage in which a CANH pin or terminal (e.g., a pin of the CAN transceiver that is connected to the CANH bus line 124) is driven towards the supply voltage, $V_{CC}$, (shown in FIG. 2) of a positive voltage (e.g., 5V) and a CANL pin or terminal (e.g., a pin of the CAN transceiver that is connected to the CANL bus line 126) is driven towards a fixed voltage (e.g., the ground voltage of 0V). In this embodiment, the second transmitter 434 includes an output stage in which a CANH pin is driven to a higher voltage but lower than the supply voltage, $V_{CC}$, of 5V or to a lower positive voltage, which results in a differential voltage on the CAN bus 104. Because the peak differential voltage of the second transmitter is lower than the peak differential voltage of the first transmitter, the electromagnetic emission of the second transmitter is lower than the electromagnetic emission of the first transmitter. Consequently, the transmission data rate of the second transmitter is lower than the transmission data rate of the first transmitter. In some embodiments, the protocol sampler is further configured to, in response to the phase information, switch from the first transmitter with a lower transmission data rate to the second transmitter with a higher transmission data rate within a bit interval for use in transmitting subsequent bits of a CAN data frame.

In some embodiments, the protocol sampler 424 is configured to, in response to the detected phase information, switch to a specific transmitter configuration of the CAN transceiver for use in transmitting a CAN data frame. For example, when the phase information indicates that a data field of a CAN data frame is being transmitted, the protocol sampler switches to a transmitter configuration with a constant impedance use in transmitting subsequent bits of the CAN data frame. In an embodiment, a transmitter (e.g., the first transmitter 432 or the second transmitter 434) includes a controllable impedance between a CANH pin or terminal (e.g., a pin of the CAN transceiver that is connected to the CANH bus line 124) and the supply voltage, $V_{CC}$, (shown in FIG. 2), a controllable impedance between the CANH pin and the ground pin, a controllable impedance between a CANL pin or terminal (e.g., a pin of the CAN transceiver that is connected to the CANL bus line 126) and the supply voltage, $V_{CC}$, and/or a controllable impedance between the CANL pin and the ground pin. By adjusting at least one of the controllable impedance of a transmitter, the transmitter can drive the CAN bus 104 with a differential constant impedance.

Figure 5:
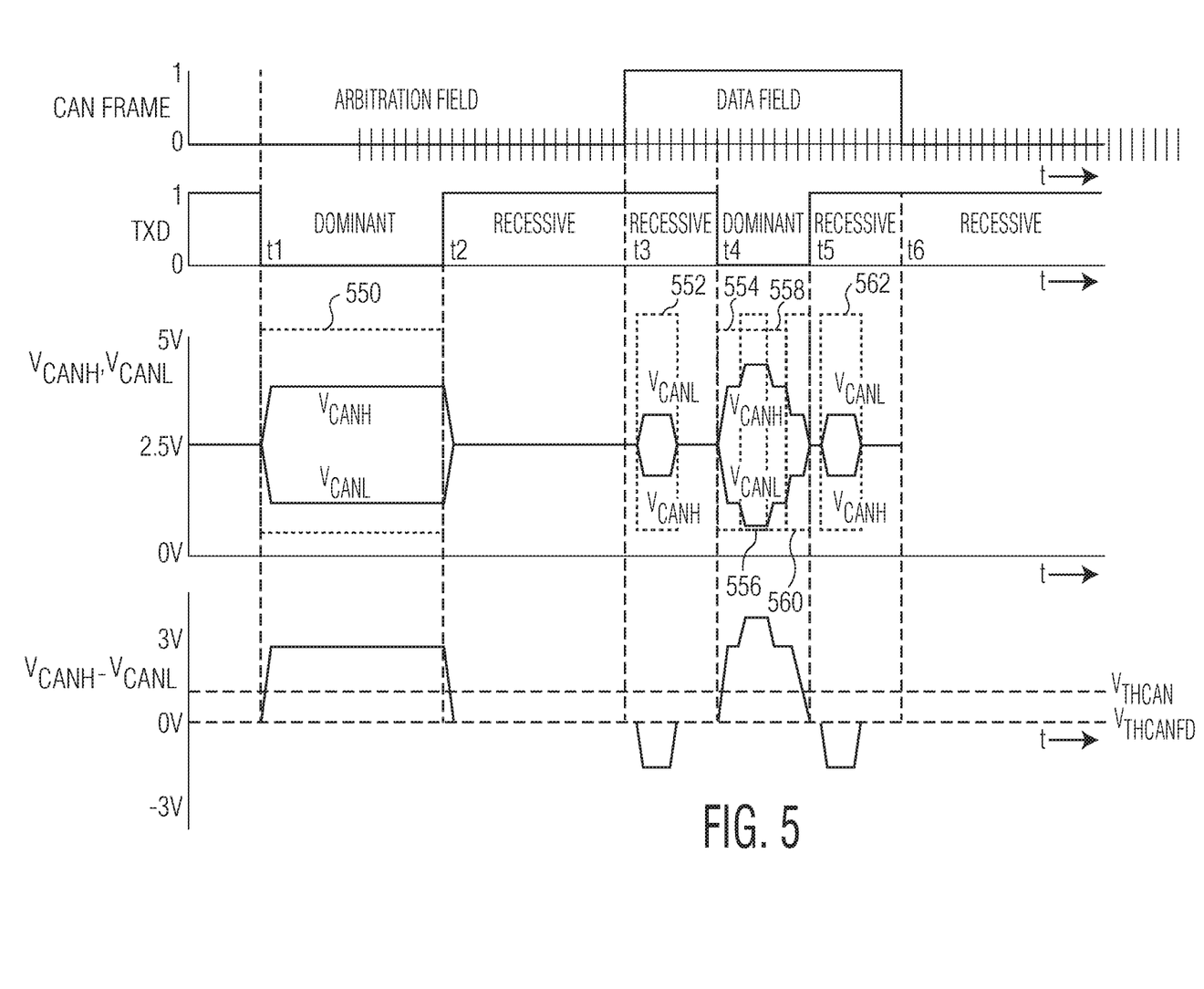
FIG. 5 illustrates an exemplary timing diagram that corresponds to the CAN device depicted in FIG. 4.

FIG. 5 illustrates an exemplary timing diagram that corresponds to the CAN device 402 depicted in FIG. 4. In the timing diagram illustrated in FIG. 5, the protocol sampler 424 of the CAN transceiver 420 follows the CAN protocol by phase and bits with sub symbol precision and switches the transmitter unit 422 between different transmitter configurations within a bit interval to adapt to the characteristics of the generated symbol dependant on phase information. The precise timing and value dependency enable the CAN device to optimize a generated symbol for higher speed and less emission. For example, the transmitter TX2 434 uses a lower differential bus voltage (e.g., in time period 552) to drive the CAN bus 104, which results in less emission compared to the full differential voltage swing used by the transmitter TX1 432 in time period 550.

Specifically, in the arbitration phase in which an arbitration field of a CAN data frame is being transmitted, multiple CAN devices can transmit CAN messages on to the CAN bus 104 simultaneously. Each CAN message starts with an identification number (ID). The CAN device that sends the lowest ID drives the most (consecutive) dominant bits and wins the arbitration. In the CAN protocol, dominant bits are actively driven on the CAN bus while recessive bits are not driven by the CAN devices and are defined by the termination. If an active CAN transceiver detects a dominant bit on the CAN bus while the CAN transceiver is not driving that bit, the active CAN transceiver will cease transmission and another CAN transceiver drives the CAN bus with a lower ID and wins arbitration.

During the arbitration phase between time point $t_1$ and time point $t_2$, the CAN transceiver 420 contends for exclusive access to the CAN bus 104 and the first transmitter TX1 432 transmit data onto the CAN bus in the time period 550 between $t_1$ and $t_2$. During the data phase between time point $t_3$ and time point $t_6$, the CAN transceiver has exclusive access to the CAN bus 104 and the CAN transceiver can switch to the transmitter TX2 434, which can vary its characteristics (e.g., impedance and/or voltage levels) at sub-bit time precision. Specifically, the transmitter TX1 432 transmit data onto the CAN bus in time periods 554 and 558 while the transmitter TX2 434 transmit data onto the CAN bus in time periods 552, 556, 560, and 562. Although transmitter configurations with different voltages are shown in FIG. 5, in other embodiments, transmitter configurations with different impedances, current capabilities and/or emission can be used.

Figure 6:
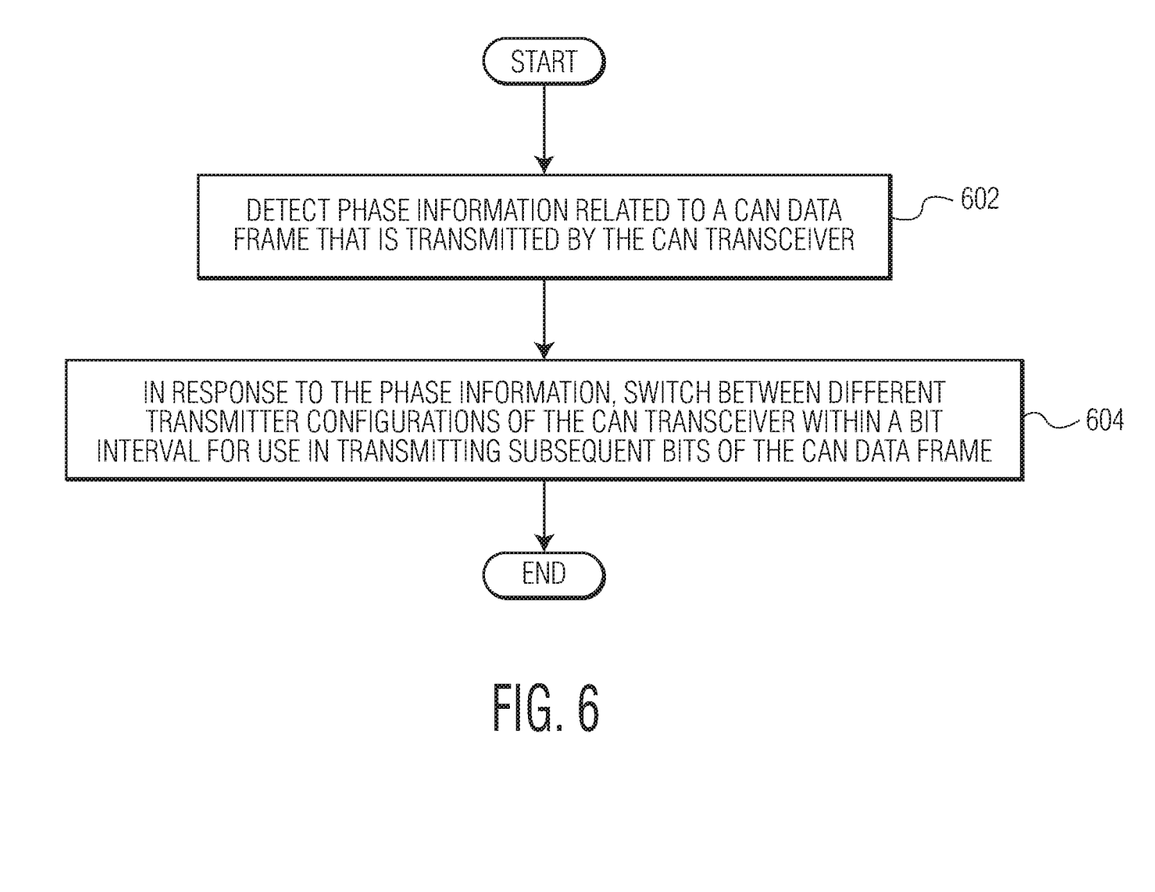
FIG. 6 is a process flow diagram of a method for operating a CAN transceiver in accordance with an embodiment of the invention.

FIG. 6 is a process flow diagram of a method for operating a CAN transceiver in accordance with an embodiment of the invention. At block 602, phase information related to a CAN data frame that is transmitted by the CAN transceiver is detected. At block 604, in response to the phase information, it is switched between different transmitter configurations of the CAN transceiver within a bit interval for use in transmitting subsequent bits of the CAN data frame. The CAN transceiver may be the same as or similar to the CAN transceivers 120 depicted in FIGS. 1 and 2 and/or to the CAN transceiver 420 depicted in FIG. 4.

Figure 7:
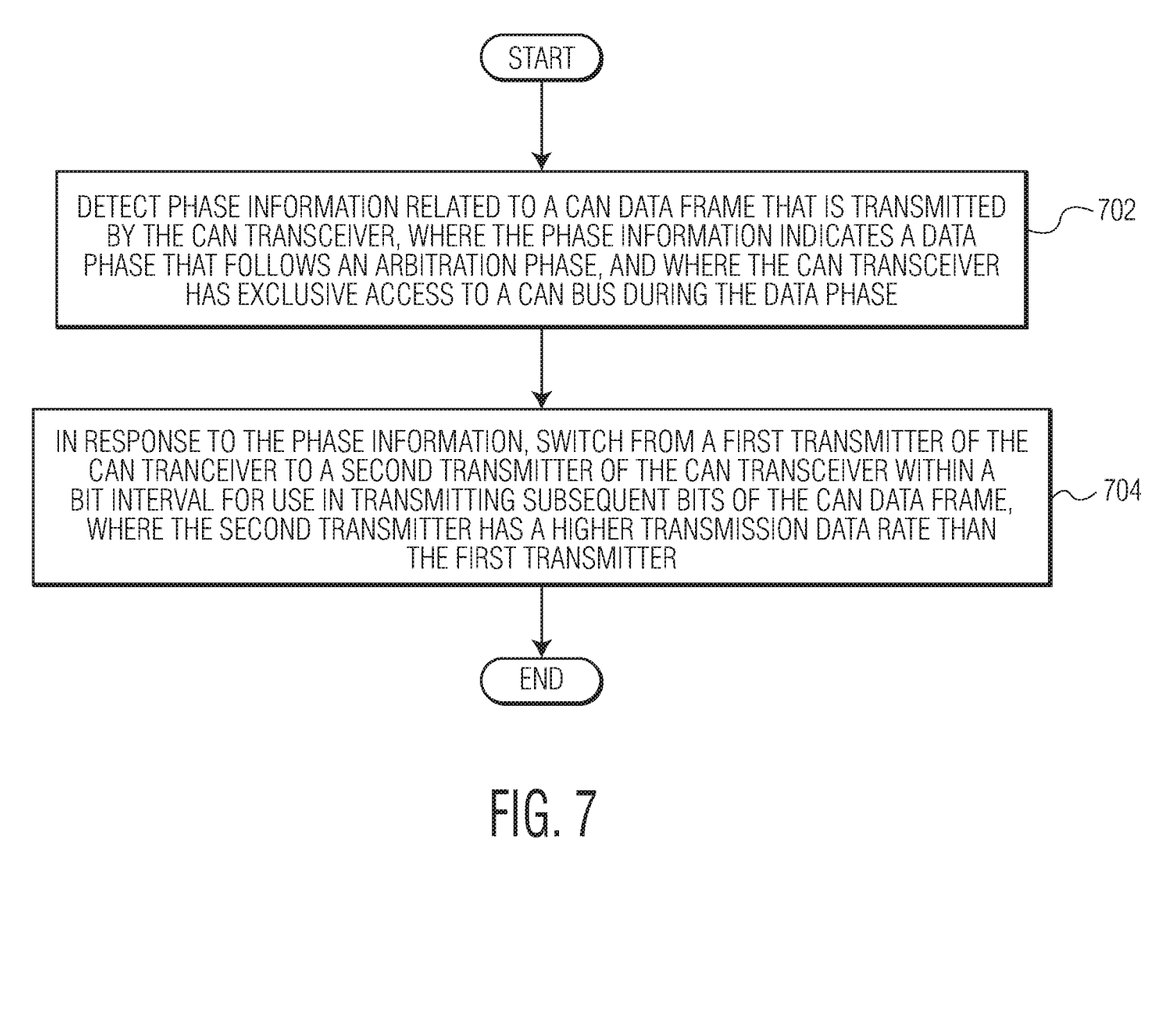
FIG. 7 is a process flow diagram of a method for operating a CAN transceiver in accordance with an embodiment of the invention.

FIG. 7 is a process flow diagram of a method for operating a CAN transceiver in accordance with an embodiment of the invention. At block 702, phase information related to a CAN data frame that is transmitted by the CAN transceiver is detected, where the phase information indicates a data phase that follows an arbitration phase, and where the CAN transceiver has exclusive access to a CAN bus during the data phase. At block 704, in response to the phase information, it is switched from a first transmitter of the CAN transceiver to a second transmitter of the CAN transceiver within a bit interval for use in transmitting subsequent bits of the CAN data frame, where the second transmitter has a higher transmission data rate than the first transmitter. The CAN transceiver may be the same as or similar to the CAN transceivers 120 depicted in FIGS. 1 and 2 and/or to the CAN transceiver 420 depicted in FIG. 4. The first and second transmitters may be the same as or similar to the first and second transmitters 432, 434 depicted in FIG. 4.

Techniques described herein can be applied to any type of In-Vehicle Networks (IVNs), including a CAN, a LIN, a MOST network, a FlexRay™ compatible network, and other types of IVNs. Although in some embodiments a CAN device is described, it should be noted that the invention is not restricted to CAN devices. In an embodiment, the above-described techniques can be applicable to CAN, CAN-FD, and ISO 11898 compliant networks. The above-described techniques can be implemented in a CAN device such as a CAN transceiver IC device, a microcontroller IC device, or an IC device that includes both a CAN transceiver and a microcontroller.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A Controller Area Network (CAN) transceiver, the CAN transceiver comprising:
   a transmitter unit configured to transmit a CAN data frame; and
   a protocol sampler connected to the transmitter unit and configured to:
      detect phase information related to the CAN data frame; and
      in response to the phase information, switch between different transmitter configurations of the transmitter unit within a bit interval for use in transmitting subsequent bits of the CAN data frame, wherein the bit interval is a time duration in which a CAN bit is transmitted by the CAN transceiver;
   wherein the transmitter unit comprises a first transmitter and a second transmitter, and wherein the protocol sampler is further configured to, in response to the phase information, switch from the first transmitter to the second transmitter within the bit interval for use in transmitting a first section of a particular bit of the CAN data frame and switch from the second transmitter to the first transmitter within the bit interval for use in transmitting a second section of the particular bit of the CAN data frame.

2. The CAN transceiver of claim 1, wherein the different transmitter configurations comprise different transmission data rates.

3. The CAN transceiver of claim 2, wherein the protocol sampler is further configured to, in response to the phase information, switch from a first transmitter configuration with a lower transmission data rate to a second transmitter configuration with a higher transmission data rate within the bit interval for use in transmitting the subsequent bits of the CAN data frame.

4. The CAN transceiver of claim 1, wherein the different transmitter configurations comprise different transmission impedance configurations, different transmission voltage configurations, different transmission current configurations, or different emission configurations.

5. The CAN transceiver of claim 1, wherein the phase information indicates a data phase that follows an arbitration phase.

6. The CAN transceiver of claim 5, wherein the CAN transceiver has exclusive access to a CAN bus during the data phase.

7. The CAN transceiver of claim 1, wherein the second transmitter has a higher transmission data rate than the first transmitter.

8. A method for operating a Controller Area Network (CAN) transceiver, the method comprising:
   detecting phase information related to a CAN data frame that is transmitted by the CAN transceiver, wherein the phase information indicates a data phase that follows an arbitration phase, and wherein the CAN transceiver has exclusive access to a CAN bus during the data phase; and
   in response to the phase information, switching from a first transmitter of the CAN transceiver to a second transmitter of the CAN transceiver within a bit interval for use in transmitting subsequent bits of the CAN data frame, wherein the second transmitter has a higher transmission data rate than the first transmitter, and wherein the bit interval is a time duration in which a CAN bit is transmitted by the CAN transceiver;
   wherein the switching comprises switching from the first transmitter to the second transmitter within the bit interval for use in transmitting a first section of a particular bit of the CAN data frame and switching from the second transmitter to the first transmitter within the bit interval for use in transmitting a second section of the particular bit of the CAN data frame.

* * * * *